United States Patent
Morishima et al.

(10) Patent No.: US 6,204,967 B1
(45) Date of Patent: Mar. 20, 2001

(54) STEREOSCOPIC IMAGE DISPLAY APPARATUS

(75) Inventors: Hideki Morishima; Kazutaka Inoguchi, both of Kawasaki; Hiroyasu Nose, Tokyo; Naosato Taniguchi, Urawa, all of (JP)

(73) Assignee: Mixed Reality Systems Laboratory Inc., Kanagawa-ken (JP)

( * ) Notice: Subject to any disclaimer, the term of this patent is extended or adjusted under 35 U.S.C. 154(b) by 0 days.

(21) Appl. No.: 09/272,387

(22) Filed: Mar. 19, 1999

(30) Foreign Application Priority Data

Sep. 22, 1998 (JP) .................................................. 10-267660

(51) Int. Cl.[7] ........................... G02B 27/22; G02B 27/10; H04N 13/04; H04N 15/00

(52) U.S. Cl. .......................... 359/462; 359/463; 359/464; 359/619; 359/620; 359/622; 348/54; 348/59

(58) Field of Search ..................................... 359/462, 463, 359/464, 618, 619, 620, 621, 622, 623, 624; 348/59; 345/419

(56) References Cited

U.S. PATENT DOCUMENTS

| | | | |
|---|---|---|---|
| 5,724,188 | * | 3/1998 | Kumagai et al. .................... 359/619 |
| 5,831,765 | * | 11/1998 | Nakayama et al. .................. 359/464 |
| 6,023,277 | * | 2/2000 | Osaka et al. .......................... 345/419 |

* cited by examiner

*Primary Examiner*—Audrey Chang
(74) *Attorney, Agent, or Firm*—Fitzpatrick, Cella, Harper & Scinto

(57) ABSTRACT

A stereoscopic image display apparatus has a light source for emitting patterned light in a predetermined shape, an optical system having horizontal optical action and vertical optical action different from each other, and a display device. The display device displays a stripe image obtained by alternating stripe pixels from a parallax image for the right eye and stripe pixels from a parallax image for the left eye in a predetermined order. The patterned light is provided with directivity by the optical system to irradiate the stripe image. The light is separated into two areas, so as to permit an observer to visually recognize the stripe image as a stereoscopic image. In the stereoscopic image display apparatus, a difference DH between a horizontal pitch Hi of the patterned light and a horizontal pixel pitch Hd of the display device is not less than a predetermined value.

33 Claims, 5 Drawing Sheets

FIG. 4
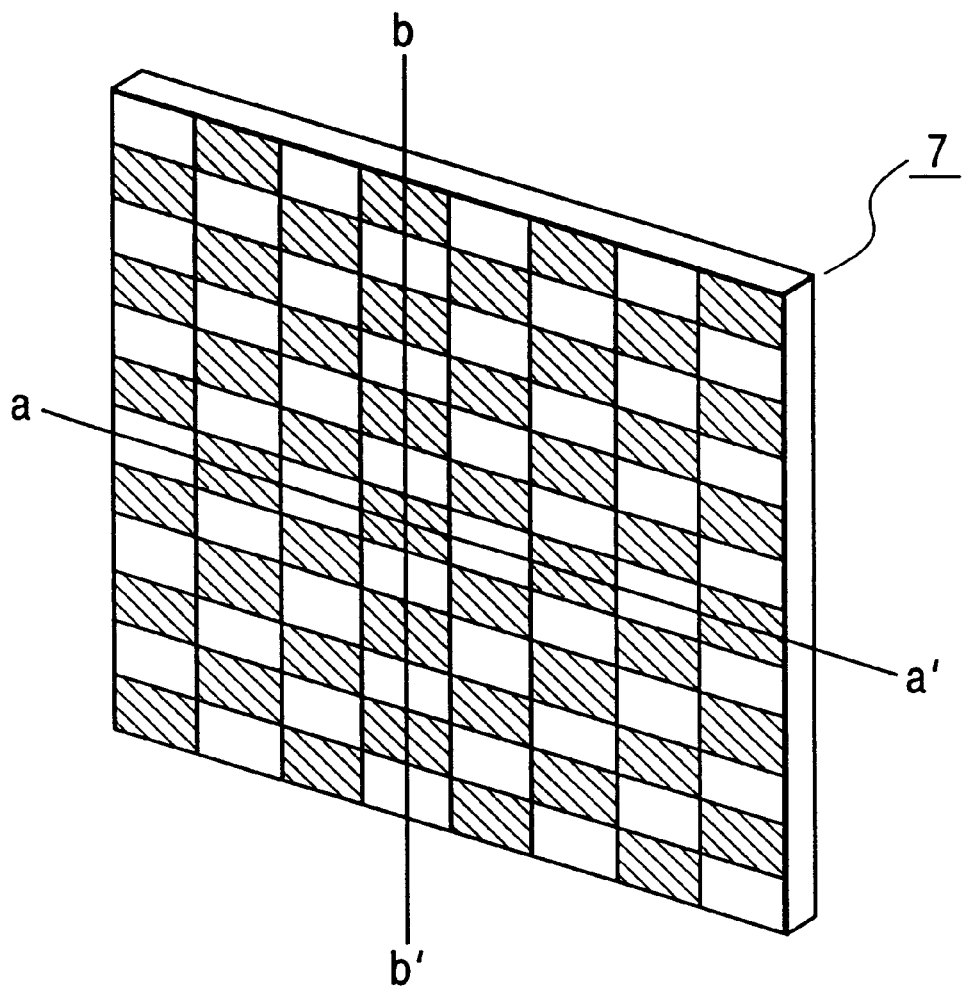
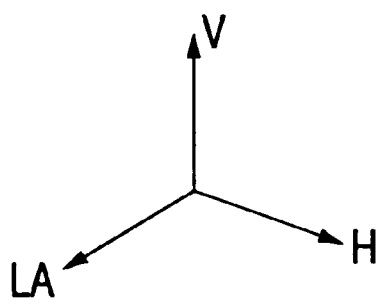

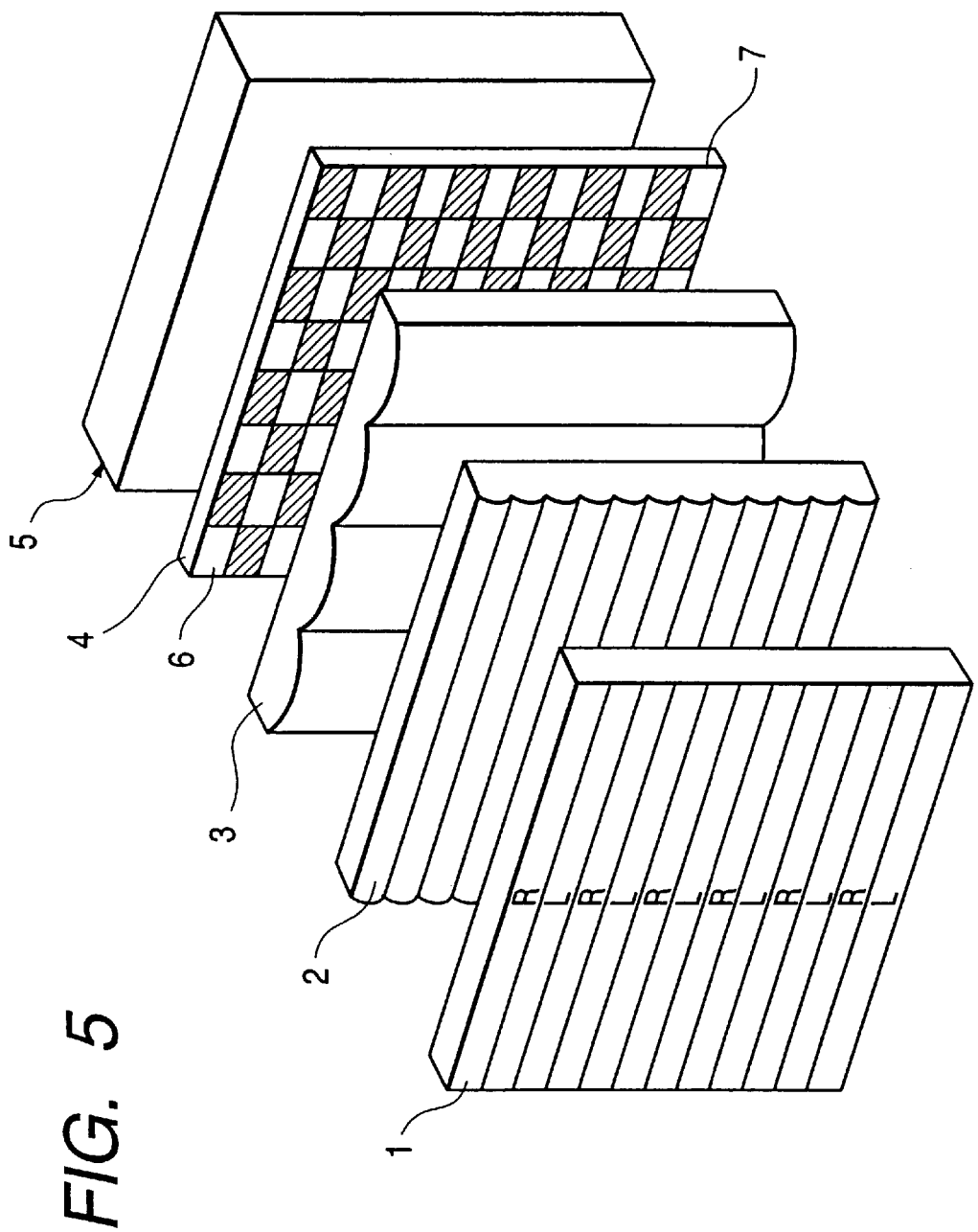
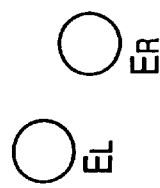
FIG. 5

STEREOSCOPIC IMAGE DISPLAY APPARATUS

BACKGROUND OF THE INVENTION

1. Field of the Invention

The present invention relates to a stereoscopic image display apparatus permitting observation of a stereoscopic image without a need for special glasses and, more particularly, to the apparatus suitably applicable to stereoscopic display in a television, a video system, a computer monitor, a game machine, and so on, which is arranged in such structure that a predetermined emission pattern is formed by a self-emission type display element such as a CRT or the like or light from an illumination light source is made to pass through aperture portions of a mask pattern having the aperture portions and shield portions arrayed at a predetermined pitch to pattern the passing beam, directivity is given to the patterned beam by an optical system having so patterned fine structure as to make the patterned beam incident separately to the right eye and to the left eye of an observer, a transmission type display device is disposed between the patterned optical system and the observer, and the display device is arranged to display a stripe image synthesized in alternate stripes of parallax images corresponding to the right eye and to the left eye, so as to permit the observer to observe a stereoscopic image.

2. Related Background Art

Applicant of the present application suggested in Japanese Laid-open Patent Application No. 9-311294 the stereoscopic image display apparatus constructed in such structure that the predetermined emission pattern is formed by the self-emission type display element such as the CRT or the like or the light from the illumination light source is made to pass through the aperture portions of the mask pattern having the aperture portions and shield portions arrayed at the predetermined pitch to pattern the passing beam, directivity is given to the patterned beam by the optical system having so patterned fine structure as to make the patterned beam incident separately to the right eye and to the left eye of the observer, the transmission type display device is disposed between the patterned optical system and the observer, and the display device is arranged to display the stripe image synthesized in alternate stripes of the parallax images corresponding to the right eye and to the left eye. FIG. 5 is a perspective view for explaining the fundamental structure of the stereoscopic image display apparatus disclosed in the above application.

In FIG. 5 reference numeral 1 schematically illustrates a liquid crystal display (LCD) for display of a image. Numeral 5 represents a back light as an illumination light source. Disposed in front of the back light 5 is a mask substrate 4 on which a mask pattern 7 having apertures 6 of a checkered pattern to transmit light is formed. Provided between the mask substrate 4 and LCD 1 are two lenticular lenses 2, 3 (a vertical lenticular lens 3 and a horizontal lenticular lens 2) which are made of transparent resin or glass in the form of microlenses and which are arranged perpendicular to each other. As illustrated, the left and right parallax images L, R are displayed in an array of horizontal stripes alternated in the vertical (altitudinal) direction in the LCD 1.

The light from the back light 5 passes through each aperture 6 of the mask substrate 4 and illuminates the LCD 1 through the vertical and horizontal lenticular lenses 3, 2, so that the left and right parallax images are separated to both eyes of the observer to be observed thereby.

According to the embodiment disclosed in the above application, pixels on the LCD 1 are illuminated by beams with intensities varying at a pitch Hi nearly equal to a horizontal pitch HL of the vertical cylindrical lenses of the vertical lenticular lens 3 in the horizontal direction.

In this structure moire fringes will appear in a vertical stripe pattern periodically to change the brightness of the LCD screen in the horizontal direction if the difference between the horizontal pitch Hi of the illumination light and the horizontal pixel pitch Hd of the pixels of the LCD 1 is within a certain range. Those moire fringes will impede the observation of stereoscopic image.

For the sake of simplicity, the horizontal distribution of intensities of the illumination light and the transmittance distribution of the LCD due to the aperture portions and the shield portions of black stripes or the like are expressed respectively as follows by cosine functions.

$$I \cdot \cos[(2\pi/Hi) \cdot x], \quad T \cdot \cos[(2\pi/Hd) \cdot x]$$

Here, I indicates the amplitude of change of illumination intensities, T the amplitude of change of LCD transmittances, and x coordinates in the horizontal direction.

The distribution of illumination light immediately after transmission through the LCD, I-LCD, is expressed in the form of the product of the above two functions and is modified as follows by use of the cosine product formula.

$$I\text{-}LCD = R \cdot \cos[(2\pi/Hi) \cdot x] \cdot T \cdot \cos[(2\pi/Hd) \cdot x] = \{\cos[2\pi \cdot (1/Hi+1/Hd) \cdot x] + \cos[2\pi \cdot (1/Hd-1/Hi) \cdot x]\} \cdot I \cdot T/2$$

The first term is a term varying at the pitch, $1/(1/Hi+1/Hd) = Hi \cdot Hd/(Hi+Hd) < Hi$, Hd. Since this pitch is much smaller than the horizontal pixel pitch Hd of the LCD 1, the observer cannot visually recognize it.

The second term is a term varying at the pitch, $1/(1/Hd-1/Hi) = Hi \cdot Hd/(Hi-Hd)$. This pitch becomes large enough for the observer to visually recognize it where the horizontal pitch Hi of the illumination light is close to some extent to the horizontal pixel pitch Hd of the LCD pixels. The second term is a term appearing as vertical stripes on the LCD screen.

In practice, the horizontal distribution of the illumination light and the horizontal transmittance distribution of the LCD are not of the simple cosine function forms but much more complicated periodic distributions. However, where each distribution is expressed in the form of a Fourier integral, the cosine function described above is a main component in each Fourier integral and thus the moire fringes appearing have the main pitch represented by the pitch described above.

SUMMARY OF THE INVENTION

An object of the present invention is, therefore, to provide a stereoscopic image display apparatus that permits good observation of a stereoscopic image while preventing the moire fringes from being observed on the LCD surface by the observer.

A stereoscopic image display apparatus of the present invention is:

(1-1) a stereoscopic image display apparatus comprising light source means for emitting patterned light in a predetermined shape, an optical system having horizontal optical action and vertical optical action different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a lot of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein a difference DH between a horizontal pitch Hi of the patterned light and a horizontal pixel pitch Hd of the display device is not less than a predetermined value.

Particularly, the stereoscopic image display apparatus is characterized:

(1-1-1) in that said difference DH between the horizontal pitch Hi and the horizontal pixel pitch Hd satisfies the following relation:

$$(Hd \times Hd)/(M\max - Hd) < DH$$

where Mmax is a permissible maximum of moire fringes appearing as vertical stripes on said display device;

(1-1-2) in that said horizontal pitch Hi and horizontal pixel pitch Hd satisfy the following relation:

$$1/M\max < |(1/Hd) - (1/Hi)|$$

where Mmax is a permissible maximum of a horizontal pitch of moire fringes appearing as vertical stripes on said display device; and so on.

Another stereoscopic image display apparatus of the present invention is:

(1-2) a stereoscopic image display apparatus comprising light source means for emitting patterned light in a predetermined shape, an optical system having horizontal optical action and vertical optical action different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a lot of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein the optical system comprises a micro optical element in which a plurality of cylindrical lenses are arranged at a predetermined horizontal pitch HL and wherein a difference DH between the horizontal pitch HL and a horizontal pixel pitch Hd of the display device is not less than a predetermined value.

Particularly, the stereoscopic image display apparatus is characterized:

(1-2-1) in that said difference DH between the horizontal pitch HL and the horizontal pixel pitch Hd satisfies the following relation:

$$(Hd \times Hd)/(M\max \times Hd) < DH$$

where Mmax is a permissible maximum of moire fringes appearing as vertical stripes on said display device;

(1-2-2) in that said horizontal pitch HL and horizontal pixel pitch Hd satisfy the following relation:

$$1/M\max < |(1/Hd) - (1/HL)|$$

where Mmax is a permissible maximum of a horizontal pitch of moire fringes appearing as vertical stripes on said display device; and so on.

In the structure (1-1) or (1-2), the apparatus is characterized:

(1-2-3) in that said permissible maximum Mmax of the horizontal pitch of the moire fringes satisfies the following relation:

$$\arctan(M\max/L0) \leq 5'-$$

where L0 is a distance from said display device to the observer;

(1-2-4) in that said permissible maximum Mmax of the horizontal pitch of the moire fringes satisfies the following relation:

$$M\max \leq 2 \cdot Hd$$

where Hd is the horizontal pixel pitch of the display device; and so on.

Another stereoscopic image display apparatus of the present invention is:

(1-3) a stereoscopic image display apparatus comprising light source means for emitting patterned light in a predetermined shape, an optical system having horizontal optical action and vertical optical action different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a lot of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein a difference DH between a horizontal pitch Hi of the patterned light and a horizontal pixel pitch Hd of the display device is not more than a predetermined value.

Particularly, the stereoscopic image display apparatus is characterized:

(1-3-1) in that said difference DH between the horizontal pitch Hi and the horizontal pixel pitch Hd satisfies the following relation:

$$DH < (Hd \times Hd)/(M\min - Hd)$$

where Mmin is a permissible minimum of moire fringes appearing as vertical stripes on said display device;

(1-3-2) in that said horizontal pitch Hi and horizontal pixel pitch Hd satisfy the following relation:

$$|(1/Hd) - (1/Hi)| < 1/M\min$$

where Mmin is a permissible minimum of a horizontal pitch of moire fringes appearing as vertical stripes on said display device; and so on.

Another stereoscopic image display apparatus of the present invention is:

(1-4) a stereoscopic image display apparatus comprising light source means for emitting patterned light in a predetermined shape, an optical system having horizontal optical action and vertical optical action different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a lot of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein the optical system comprises a micro optical element in which a plurality of cylindrical lenses are arranged at a predetermined horizontal pitch HL and wherein a difference DH between the horizontal pitch HL and a horizontal pixel pitch Hd of the display device is not more than a predetermined value.

Particularly, the stereoscopic image display apparatus is characterized:

(1-4-1) in that said difference DH between the horizontal pitch HL and the horizontal pixel pitch Hd satisfies the following relation:

$$DH<(Hd \times Hd)/(M\text{min}-Hd=l\,)$$

where Mmin is a permissible minimum of moire fringes appearing as vertical stripes on said display device;

(1-4-2) in that said horizontal pitch HL and horizontal pixel pitch Hd satisfy the following relation:

$$|(1/Hd)-(1/HL)|<1/M\text{min}$$

where Mmin is a permissible minimum of a horizontal pitch of moire fringes appearing as vertical stripes on said display device; and so on.

In the structure (1-3) or (1-4), the apparatus is characterized:

(1-4-3) in that said permissible minimum Mmin of the horizontal pitch of the moire fringes satisfies the following relation:

$$M\text{min} \geq W$$

where W is a horizontal width of the display device;

(1-4-4) in that said permissible minimum Mmin of the horizontal pitch of the moire fringes satisfies the following relation:

$$M\text{min} \geq 2 \cdot W$$

where W is a horizontal width of the display device; and so on.

A stereoscopic image display method of the present invention is:

(2-1) a stereoscopic image display method for permitting the observer to observe a stereoscopic image from the stripe image displayed on the display device, using the stereoscopic image display apparatus as set forth in either one of the structures (1-1) to (1-4).

BRIEF DESCRIPTION OF THE DRAWINGS

FIG. 4 is an explanatory diagram to explain part of FIG. 1; and

FIG. 5 is a perspective view to show the main part of the conventional stereoscopic image display apparatus.

DETAILED DESCRIPTION OF THE PREFERRED EMBODIMENTS (Embodiment 1)

Figure 1:
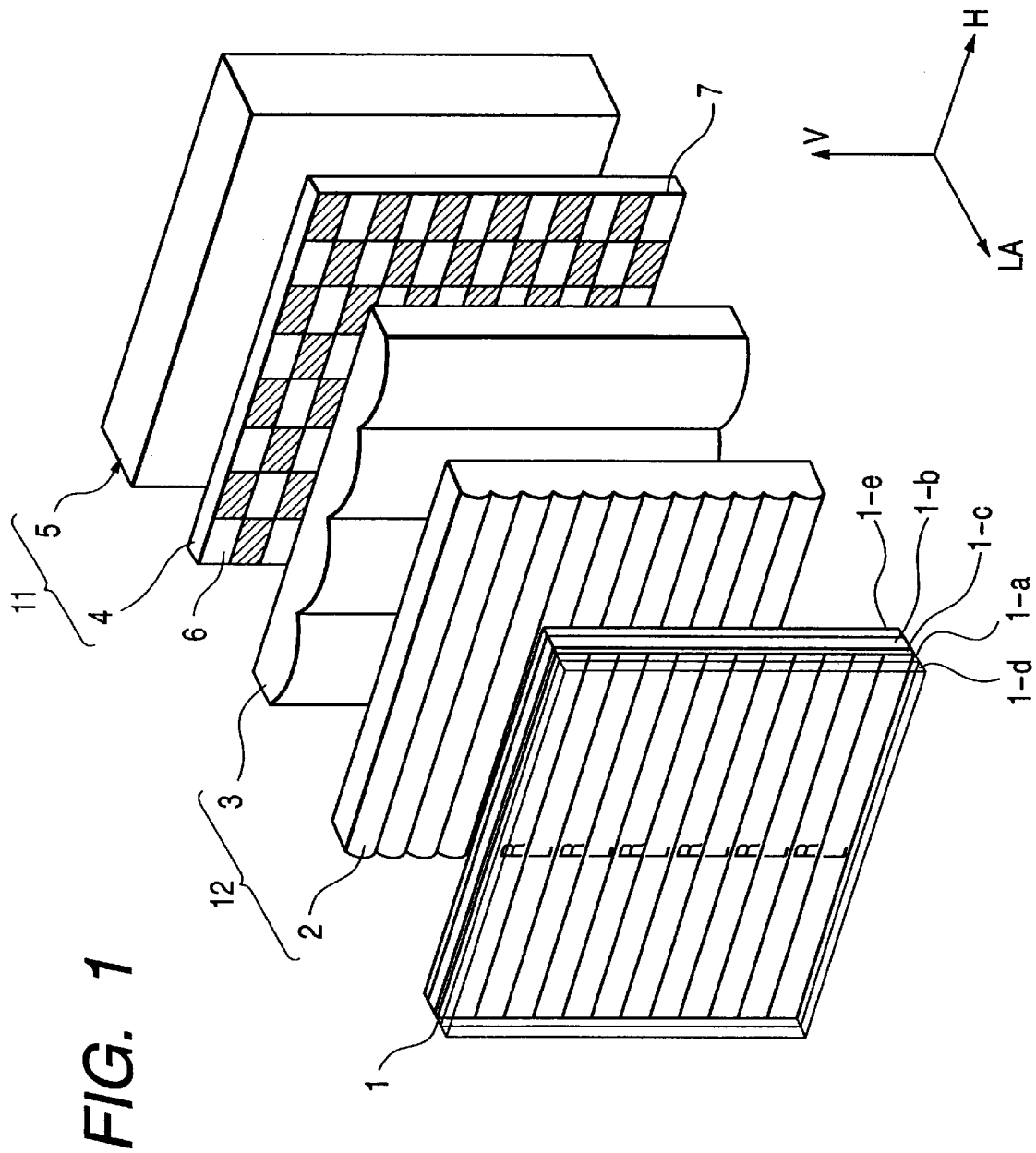
FIG. 1 is a perspective view for explaining the structure of an embodiment of the present invention.

FIG. 1 is a perspective view for explaining the structure of Embodiment 1 of the stereoscopic image display apparatus according to the present invention.

The present embodiment will be described referring to the drawings. The fundamental structure of the present embodiment is the same as that in the conventional example which was described referring to FIG. 5, but the liquid crystal display (LCD) for display of image etc. will be described in further detail.

Numeral 1 denotes the LCD. The LCD 1 has glass substrates 1-a, 1-b, a liquid crystal layer 1-c, polarizing plates 1-d, 1-e, and so on. It is noted here that illustration is omitted for elements that can be neglected from the aspect of geometrical optics because of their small thickness, including a color filter, electrodes, a black matrix, an anti-reflection film, and so on. Numeral 5 represents the back light as an illumination light source. Disposed in front of the back light is the mask substrate 4 on which the mask pattern 7 having the apertures 6 of the checkered pattern to transmit light is formed.

The mask pattern 7 is made of an evaporated film of metal such as chromium or a light absorbing material and on the mask substrate 4 of glass or resin by patterning as illustrated in FIG. 4. Each of the back light 5 and the mask substrate 4 constitutes an element of the light source means.

Disposed between the mask substrate 4 and the LCD 1 are the two lenticular lenses 2, 3 (the vertical lenticular lens 3 and the horizontal lenticular lens 2) composing a micro optical element (optical system) 12, which are made of transparent resin or glass and which are arranged perpendicular to each other. In the LCD 1 the left and right parallax images L, R are displayed as an array of horizontal stripes alternated in the vertical (altitudinal) direction as illustrated.

The light from the back light 5 passes through each aperture 6 of the mask substrate 4 and then through the vertical lenticular lens 3 and horizontal lenticular lens 2 to illuminate the LCD 1 and beams from the left and right parallax images L, R of the LCD 1 are guided to the left and right eyes EL, ER of the observer, whereupon the both eyes can observe the left and right parallax images L, R separately.

The present embodiment is characterized in that the horizontal pitch of the periodically patterned illumination beams is properly set in order to make the pitch of the moire fringes appearing on the display surface of the LCD 1 too fine for the observer to visually recognize the moire fringes, thereby preventing the moire fringes from impeding the observation of stereoscopic image.

Next described is the optical action in the horizontal cross section and in the vertical cross section. First, FIG. 2 concerning the pixel pitch Hd in the horizontal direction H of the LCD 1 is a horizontal sectional view of the stereoscopic image display apparatus of the present embodiment cut by a horizontal plane including the observer's eyes (EL, ER) and one image line for the left eye (L) on the LCD 1, which is an H-LA sectional view of FIG. 1 and cross section along a line segment a–a' of FIG. 4.

The members are denoted by common reference symbols to those in FIG. 1. The back light 5 illuminates the mask pattern 7 of the mask substrate 4 and the light comes out of the apertures 6. The vertical lenticular lens 3 is disposed in front of the mask substrate 4 and the lens curvature of the cylindrical lenses 3a is designed so that the mask pattern 7 is located approximately at the focal point of each cylindrical lens 3a. A pair of aperture portion 6 and shield portion 7a of the mask pattern 7 is designed so as to correspond approximately to one pitch of one cylindrical lens 3a of the vertical lenticular lens 3.

The pattern of the aperture portions 6 and shield portions 7a illustrated corresponds to the left image L among the left and right images (L, R) of the horizontal stripes alternated in the vertical direction and displayed on the LCD 1, and the light emerging from the aperture portions 6 illuminates the left image L of the LCD 1 through the vertical lenticular lens 3 in a range indicated by solid lines in the drawing, with directivity.

With the left eye EL of the observer being located in this range, the pitch of the vertical lenticular lens 3 is set a little smaller than the pitch of a pair of the aperture portion 6 and shield portion 7a of the mask pattern 7 so that the light from the aperture portions 6 is uniformly converged to the left eye EL throughout the entire width of the screen.

This permits the left image L on the horizontal stripe displayed in the LCD 1 to be observed only in the range near the left eye EL. As for the right eye ER, the pattern of the aperture portions 6 and shield portions 7a of the mask pattern 7 is reverse to that in the drawing and thus corresponds to a stripe of the right image R among the left and right images L, R of horizontal stripes alternated in the vertical direction and displayed on the LCD 1, and the right image R is illuminated with the light through the vertical lenticular lens 3 to be projected with directivity into a range near the right eye ER.

This permits the right image R of the horizontal stripe displayed on the LCD 1 to be observed only in the range near the right eye ER. As described, the left and right images L, R on the LCD 1 are observed as being separated horizontally into the left eye EL and into the right eye ER.

Figure 2:
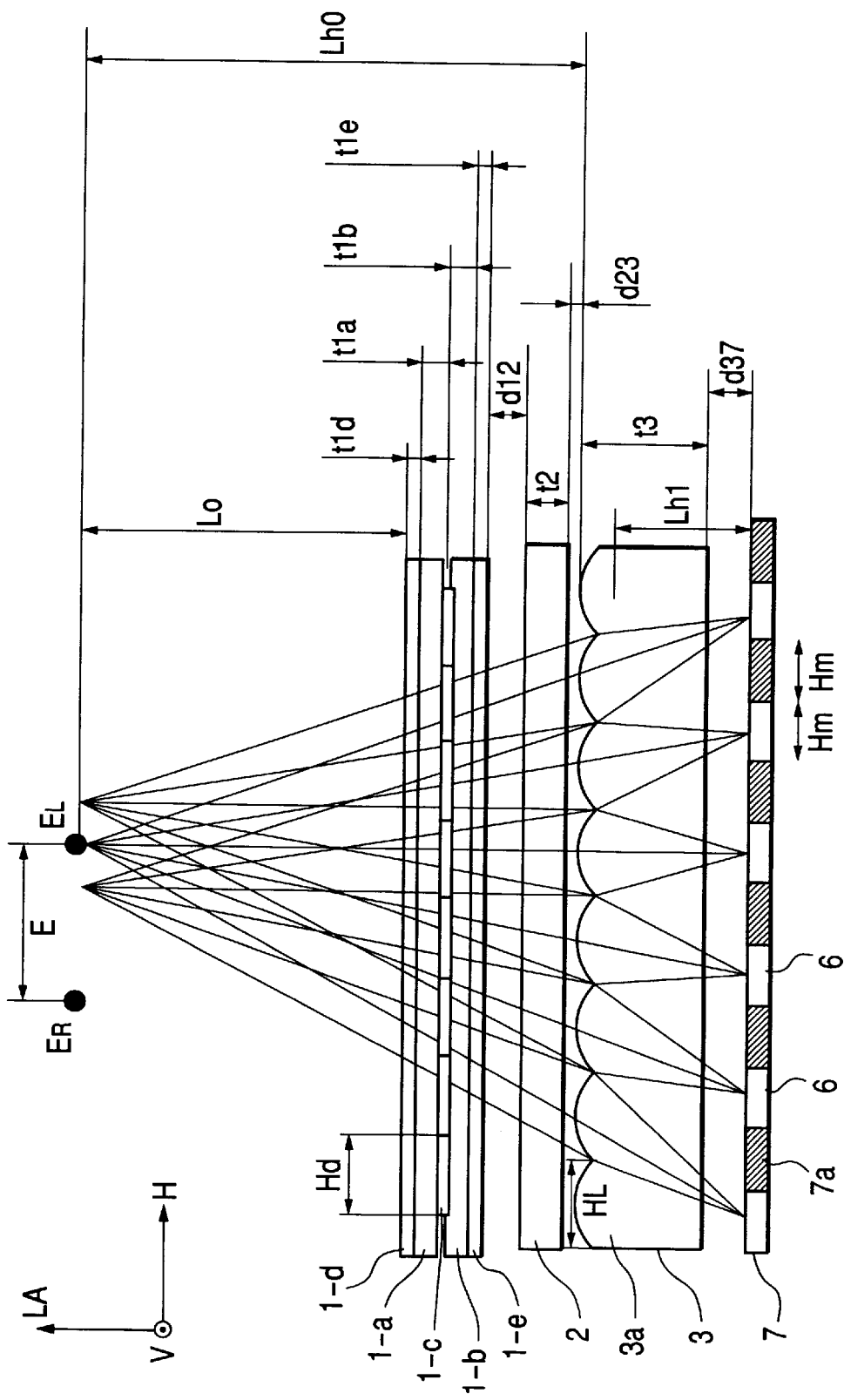
FIG. 2 is a horizontal sectional view of FIG. 1.

The relationship described referring to FIG. 2 will be expressed using equations. Let Hm be the horizontal width of the shield portions or the aperture portions of the mask pattern 7, HL be the horizontal pitch of the vertical lenticular lens 3, Lh1 be the optical spacing between the mask pattern 7 and the vertical lenticular lens 3, Lh0 be the optical spacing between the vertical lenticular lens 3 and the observation plane on which the left and right eyes of the observer should be placed, fh be the focal length of each cylindrical lens forming the vertical lenticular lens, and E be the distance between the eyes. Then the following relations hold.

$$E:Hm = Lh0:Lh1 \quad (1)$$

$$2*Hm:HL = (Lh0+Lh1):Lh0 \quad (2)$$

$$fh = Lh1 \quad (3)$$

Figure 3:
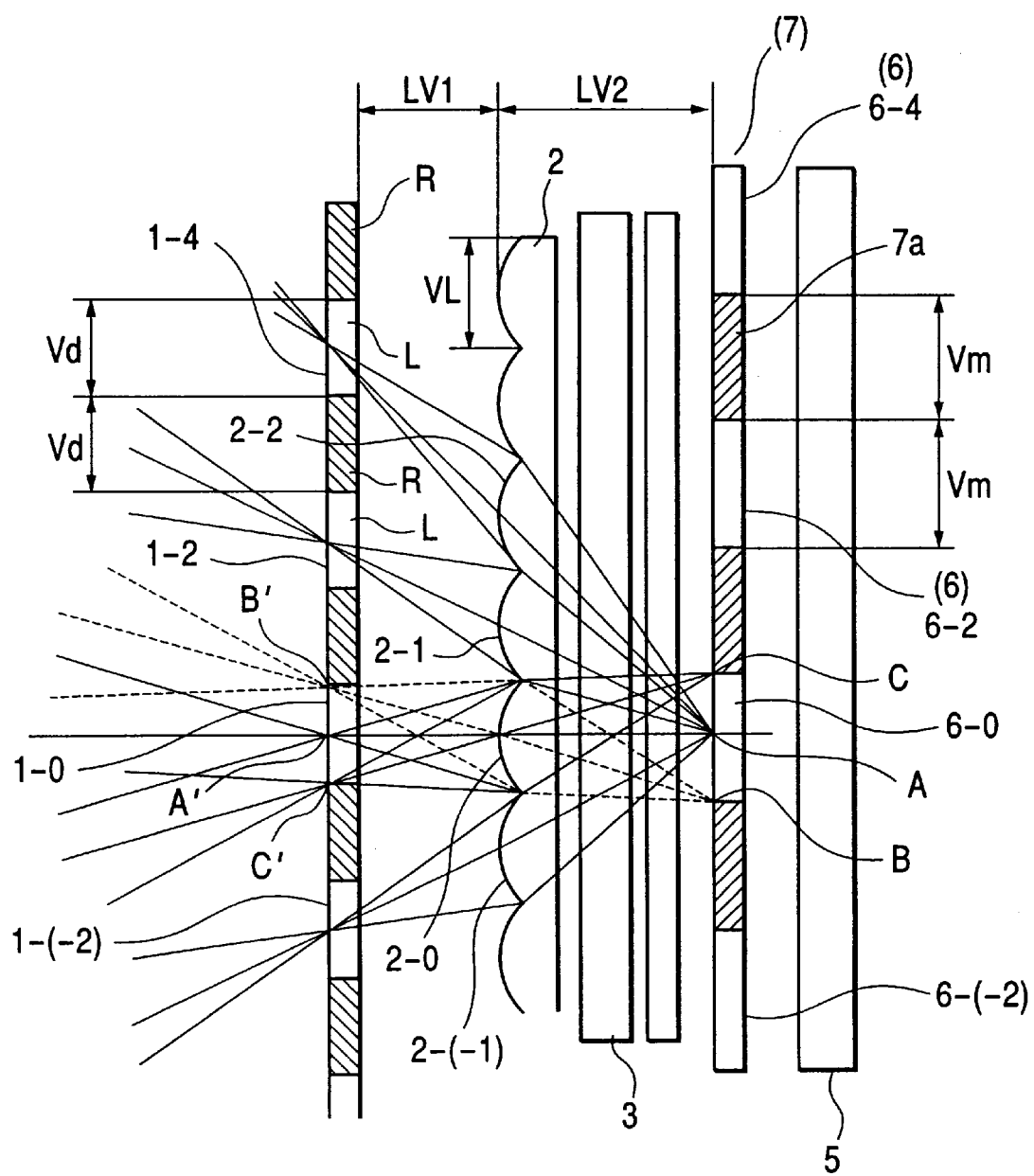
FIG. 3 is a vertical sectional view of FIG. 1.

Next described is the optical action in the vertical cross section of FIG. 1. FIG. 3 is a V-LA sectional view of the stereoscopic image display apparatus of FIG. 1 along the vertical (altitudinal) direction, which is a sectional view along the line segment b–b' of FIG. 4.

In FIG. 3 the vertical lenticular lens 3 having no optical action in this cross section is illustrated as a parallel-plane plate. The flat glass plates forming the LCD 1, which have no direct relation with the optical action, are omitted from the illustration and the lenticular lens 2 is expressed conceptually.

Since the apertures of the mask pattern 7 of the mask substrate 4 are of the checkered pattern as illustrated in FIG. 1, they correspond to the left and right images L, R of the horizontal stripes alternated in the vertical direction and displayed on the LCD 1, in the vertical direction.

In FIG. 3, the individual aperture portions 6 of the mask pattern 7 are for illuminating the image lines for either one eye of the observer and the display of the image lines for the left eye of the observer will be described herein. The shield portions of the mask pattern 7 are illustrated as black solid portions.

The lines of the LCD 1 corresponding to the left eye are illustrated as white portions and the lines corresponding to the right eye as black solid portions.

Let Vm be the vertical width of the aperture portions 6 or the shield portions 7a of the mask pattern 7 in the vertical direction, VL be the pitch of one cylindrical lens (2-0, 2-1, . . . ) of the lenticular lens 2, fv be the focal length in the direction in the plane of FIG. 3 of each cylindrical lens forming the lenticular lens 2, Vd be the vertical pixel pitch of the LCD 1, Lv1 be the distance from the display surface of LCD 1 to the lenticular lens 2, and Lv2 be the distance from the lenticular lens 2 to the mask pattern 7. Then these are set so as to satisfy the following relations.

$$Vd:Vm = Lv1:Lv2 \quad (4)$$

$$Vd:VL = (Lv1+Lv2)/2:Lv2 \quad (5)$$

$$1/fv = 1/Lv1+1/Lv2 \quad (6)$$

At this time each aperture 6 of the mask pattern 7 is converged as a focal line normal to the plane of FIG. 3, on an image line corresponding thereto. Focusing attention on one aperture among the checkered apertures, beams emitted from a point A at the center of the center aperture 6-0 and being incident to the corresponding cylindrical lens 2-0 of the lenticular lens 2 are converged as a focal line on a point A' at the center of the corresponding pixel line 1-0 of the LCD.

Beams emergent from the point A at the center of the center aperture 6-0 and incident to the other cylindrical lenses {2-1, 2-2, 2-(-1)} forming the lenticular lens 2 than the cylindrical lens 2-0 are converged as focal lines at centers of pixel lines L displaying the image for the left eye on the LCD 1.

Beams emergent from points B, C at the edge of the aperture 6-0 and incident to the corresponding cylindrical lens 2-0 of the lenticular lens 2 are converged as focal lines on points B', C', respectively, at the edge of the pixel line 1-0. Likewise, beams emergent from the other points of the aperture 6-0 and incident to the cylindrical lens 2-0 are also converged as focal lines on the pixel line 1-0 of the LCD 1. The beams emergent from the aperture 6-0 and incident to the other cylindrical lenses than the cylindrical lens 2-0 are also converged all on the pixel lines L displaying the image for the left eye of the LCD 1. Beams emergent from the other aperture portions than the aperture 6-0 of the checkered apertures 6 are also converged on the pixel lines L displaying the image for the left eye of the LCD 1 to illuminate the pixel lines for the left eye of the LCD 1 and be transmitted thereby. The beams diverge according to the NA upon the convergence only in the vertical direction, thereby obtaining such an observation area that the observer can observe the left and right images as separated uniformly throughout the entire vertical width of the screen from a predetermined height of the eyes of the observer.

The above described the image for the left eye of the observer, and the same function is also achieved as to the image for the right eye of the observer.

By the above-stated optical action in the horizontal direction and in the vertical direction, the left and right images L, R of the horizontal stripes displayed on the LCD 1 as illustrated in FIG. 1 are guided to the positions of the corresponding view points to be recognized as a stereoscopic image by the observer.

Parameters illustrated in FIG. 2 will be listed below and the features of the present invention will be discussed. Since the liquid crystal layer 1-c is very thin, the thickness thereof will be ignored in the description hereinafter.

Parameter t1a is the thickness of the glass substrate 1-a, n1a the index of refraction of the material of the glass substrate 1-a, t1b the thickness of the glass substrate 1-b, n1b the index of refraction of the material of the glass substrate 1-b, t1d the thickness of the polarizing plate 1-d, n1d the index of refraction of the material of the polarizing plate 1-d, t1e the thickness of the polarizing plate 1-e, and n1e the index of refraction of the material of the polarizing plate 1-e.

Parameter t2 is the thickness of the horizontal lenticular lens 2, n2 the index of refraction of the material of the horizontal lenticular lens 2, t3 the thickness of the vertical lenticular lens 3, and n3 the index of refraction of the material of the vertical lenticular lens 3.

Parameter d12 is the aerial spacing between the LCD 1 and the horizontal lenticular lens 2, d23 the aerial spacing between the horizontal lenticular lens 2 and the vertical lenticular lens 3, and d37 the aerial spacing between the vertical lenticular lens 3 and the mask pattern 7.

Parameter Hm is the horizontal width of the aperture portions 6 or the shield portions of the mask pattern 7, HL the horizontal pitch of the vertical lenticular lens 3, Hi the horizontal pitch of the intensity distribution of the illumination light on the LCD 1, Vm the vertical width of the aperture portions 6 or the shield portions of the mask pattern 7, VL the vertical pitch of the horizontal lenticular lens 2, Hd the horizontal pixel pitch of the LCD 1, Vd the vertical pixel pitch of the LCD 1, L0 the distance from the front surface of the LCD 1 to the observer, Lh0 the optical distance from the vertical lenticular lens 3 to the observer, Lh1 the optical distance from the mask pattern 7 to the vertical lenticular lens 3, Lv1 the optical distance from the liquid crystal layer 1-c of the LCD 1 to the horizontal lenticular lens 2, and Lv2 the optical distance from the horizontal lenticular lens 2 to the mask pattern 7.

Parameter fh is the focal length of each cylindrical lens forming the vertical lenticular lens 3, rh the radius of curvature of each cylindrical lens forming the vertical lenticular lens 3, fv the focal length of each cylindrical lens forming the horizontal lenticular lens 2, rv the radius of curvature of each cylindrical lens forming the horizontal lenticular lens 2, M the pitch of the moire fringes appearing on the LCD 1, and E the distance between the eyes (EL, ER).

In FIG. 2 the LCD 1 is illuminated by the light collimated in the horizontal direction by the vertical lenticular lens 3 after emitted from the aperture portions 6 of the mask pattern 7. The horizontal pitch Hi of the intensity distribution of the illumination light basically reflects the horizontal pitch HL of the vertical lenticular lens 3.

We can thus assume that Hi≈HL and only one thing that we have to do is that the horizontal pitch HL is set so as to make the pitch of the moire fringes small enough.

Each of the parameters Hm, HL, Lh0, Lh1, and fh has to be determined so that Eqs. (1) to (3) hold. In addition, the following equation also holds.

$$1/M = 1/Hd - 1/HL \quad (7)$$

From these equations, the following relations hold.

$$HL = M \cdot Hd/(M-Hd) \quad (8)$$

$$Lh1 = HL \cdot Lh0 \cdot (2 \cdot E - HL) \quad (9)$$

It is clear that the following relations hold.

$$Lh0 = L0 + t1d/n1d + t1a/n1a + t1b/n1b + t1e/n1e + d12 + t2/n2 + d23 \quad (10)$$

$$Lh1 = t3/n3 + d37 \quad (11)$$

$$fh = Lh1 \quad (12)$$

$$rh = fh \cdot (n3 - 1.0) \quad (13)$$

First, the parameters in the horizontal direction will be determined. Since the horizontal pixel pitch Hd of the LCD 1 (FIG. 2), the vertical pixel pitch Vd of the LCD 1 (FIG. 3), and the thicknesses and refractive indices t11, t12, n11, n12 of the glass substrates of the LCD 1 are determined depending upon the LCD 1, they are handled as fixed values.

The eye distance E and observation distance L0 are preliminarily determined as specifications of the stereoscopic display and thus are handled as fixed values. The optical distance Lh0 from the vertical lenticular lens 3 to the observer is different from the observation distance L0 by t11/n11+t12/n12+d12+t2/n2+d23 from Eq. (10), but the observation distance L0 is normally from 500 mm to 1000 mm and the difference between the optical distance Lh0 and the observation distance L0 is not over 30 mm when estimated to the highest.

It can be preliminarily determined that the optical distance Lh0 is equal to the observation distance L0 accordingly. Since the relations (4) to (6) in the vertical direction do not include the observation distance L0, such determination will not affect the parameters in the vertical direction, either. Only one effect due to the above determination is that the actual observation distance L0 becomes shorter by at most approximately 30 mm.

Once the target value M is determined for the pitch of the moire fringes, the horizontal pitch HL of the vertical lenticular lens 3 is also determined from Eq. (8).

Since the optical distance Lh0 was determined, the optical distance Lh1 is determined from Eq. (9). The thickness t3 is set to a value in which the lenticular lens can be produced readily, and the rest is defined as the aerial spacing d37. The focal length fh and the radius of curvature rh are determined from Eqs. (12) and (13), and thus all the parameters in the horizontal direction have been determined.

The parameters Vm, VL, Vd, Lv1, Lv2, and fv have to be determined so that Eqs. (4) to (6) hold. For simplicity of discussion, Eqs. (4) to (6) hold when the parameters in the vertical direction are set as follows.

$$Vm = VL = Vd \quad (14)$$

$$Lv1 = Lv2 \quad (15)$$

$$fv = Lv1/2 \quad (16)$$

In addition, the following relations also hold.

$$Lv1 = t1b/n1b + t1e/n1e + d12 \quad (17)$$

$$Lv2 = t2/n2 + d23 + t3/n3 + d37 \quad (18)$$

$$rv = fv \cdot (n2 - 1.0) \quad (19)$$

Now, supposing d23=0 for simplicity and the thickness and material of the horizontal lenticular lens 2 are set, the optical distance Lv2 is determined from Eq. (15), the aerial spacing d12 from Eq. (17), the focal length fv from Eq. (16), and the radius of curvature rv from Eq. (19), thus completing the setting of all the parameters.

Now, let us discuss restrictions imposed on each parameter when the moire fringe pitch (the moire target value) M is set to be not more than the permissible maximum Mmax of the moire fringes. From Eq. (8), the pitch M is given as follows.

$$M = Hd \cdot Hi/(Hi - Hd)$$

Let us define the difference DH between the pitch Hi of the intensity distribution or the horizontal pitch HL and the horizontal pixel pitch Hd as follows.

$$DH = Hi - Hd = HL - Hd$$

Then we obtain the following.

$$M = Hd \cdot (Hd + DH)/DH$$

Solving this with respect to DH, we obtain the following.

$$DH = Hd \cdot Hd/(M - Hd)$$

Since the moire fringe pitch M has to be smaller than Mmax, the following is required.

$$DH = Hd \cdot Hd/(M - Hd) > Hd \cdot Hd/(Mmax - Hd)$$

This indicates that a condition for making the moire pitch M smaller than Mmax is that the difference between Hi or HL and Hd is greater than $$Hd \cdot Hd/(Mmax - Hd).$$

From Eqs. (1), (2), we have the following relation.

$$Hi = HL = 2 \cdot E \cdot Lh1/(Lh0 + Lh1)$$

Thus, substituting this into Eq. (7), we obtain the following.

$$1/M = |1/Hd - (Lh0 + Lh1)/(2 \cdot E \cdot Lh1)|$$

Therefore, the condition for making the moire pitch M smaller than Mmax is given as follows.

$$1/Mmax < |1/Hd - (Lh0 + Lh1)/(2 \cdot E \cdot Lh1)|$$

It is considered as to the permissible maximum Mmax of the moire fringe pitch that the moire fringes are not so conspicuous if an angle that the pitch of the moire fringes subtends at the observer is not more than 5'.

It is generally mentioned that the resolving limit of humans is 1', but a criterion for determining whether the continuous periodic structure like the moire fringes is conspicuous or not must be gentler than the numerical value defined by the resolving limit.

Applicant of the present application prototyped a 3D display according to the present invention in which the angle that the moire pitch M subtended at the observer was about 8', and it was verified thereby that the moire fringes were not so conspicuous and did not impede the stereoscopy too much.

It is thus considered that the requirement that the angle that the pitch of the moire fringes subtends at the observer is not more than 5', with a small margin for the permissible maximum Mmax of the moire fringes, is a sufficient condition.

Therefore, the maximum Mmax can be determined so as to satisfy the following.

$$\arctan(Mmax/L0) \leq 5'$$

It is also possible to determine the permissible maximum Mmax of the moire fringes, based on the pixels of the LCD.

The pitch of the moire fringes is always greater than the horizontal pixel pitch Hd of the LCD and the moire fringes are considered to become inconspicuous if the pitch of the moire fringes is not more than two times the horizontal pixel pitch Hd of the LCD.

Therefore, the maximum Mmax can be determined so as to satisfy the following.

$$Mmax \leq 2 \cdot Hd.$$

It is a matter of course that the influence of the moire fringes can be decreased greatly even if the a larger value than those described above is employed for the maximum of the moire fringes and that it can be selected freely in practical design within the scope in which the moire fringes are inconspicuous.

Specific numerical examples will be given below. Let us suppose the following values.

$$Hd = 0.3 \text{ mm}$$

$$Vd = Vm = VL = 0.3 \text{ mm}$$

$$t1a = t1b = 1.0 \text{ mm}$$

$$t1d = t1e = 0.5 \text{ mm}$$

$$n1a = n1b = n1d = n1e = n2 = n3 = 1.5$$

$$E = 65 \text{ mm}$$

$$Lh0 = 650 \text{ mm}$$

Supposing the moire pitch M is 0.45 mm, which is one and half times one pixel, we obtain the following from Eq. (8).

$$HL = 0.9 \text{ mm}$$

From Eq. (9), we obtain the following.

$$Lh1 = 4.53137 \text{ mm}$$

Assuming t3=3 mm, we obtain the following.

$$d37 = Lh1 - 3/1.5 = 2.53137$$

$$rh = Lh1 \cdot (1.5 - 1.0) = 2.26569 \text{ mm}$$

Supposing d23=0 mm and t2=3 mm, we obtain the following from Eq. (18).

$$Lv2 = 6.53137 \text{ mm}$$

Then the following is derived from Eqs. (15) and (17).

$$d12 = 5.53137 \text{ mm}$$

The following is also derived from Eqs. (16) and (19).

$$rv = 1.6328425 \text{ mm}$$

Let us also suppose the moire pitch M is as follows:

$$M = 0.7 \text{ mm}.$$

Then we have the following.

$$\arctan(M\max/Lh0)=3.702''$$

For M=0.7 mm, HL is obtained as follows from Eq. (8).

$$HL=0.525 \text{ mm}$$

From Eq. (9), Lh1 is given as follows.

$$Lh1=2.6356439 \text{ mm}$$

Supposing d37=0, we obtain the following.

$$t3=Lh1*n3=3.9534659 \text{ mm}$$

$$rh=Lh1\cdot(1.5-1.0)=1.31782197 \text{ mm}$$

Supposing d23=0 mm and t2=1.5 mm, we obtain the following from Eq. (18).

$$Lv2=3.635644 \text{ mm}$$

From Eqs. (15) and (17), the following is derived.

$$d12=2.635644 \text{ mm}$$

From Eqs. (16) and (19), the following is derived.

$$rv=0.908911 \text{ mm}$$

In the present embodiment the LCD 1 is considered to be a monochromatic liquid crystal display. In this case, one pixel is equal to one dot and Hd is equal to the horizontal width of one pixel.

When a color LCD is applied, a color filter of a stripe array is employed. In this case, one pixel is equal to three dots (R, G, B) and the horizontal pixel pitch Hd is equal to the horizontal width of three dots (R, G, B). The like idea is also employed in next Embodiment 2.

(Embodiment 2)

Embodiment 2 of the present invention will be described next. The present embodiment is different from Embodiment 1 in the following respects. In Embodiment 1, the horizontal pitch of the periodically patterned illumination beams was set so that the pitch of the moire fringes appearing on the display surface of the LCD 1 became too small for the observer to visually recognize the moire fringes in order to prevent the moire fringes from impeding the observation of stereoscopic image.

In contrast with it, in Embodiment 2 the horizontal pitch of the periodically patterned illumination beams is set so that the pitch of the moire fringes appearing on the display surface of the LCD 1 becomes too large for the observer to visually recognize the moire fringes to the contrary.

Since the structure is exactly the same as in Embodiment 1, FIG. 1 to FIG. 3 will also be used as reference figures in the present embodiment as they are.

Eq. (1) to Eq. (19) described above also hold, which is also exactly the same as in Embodiment 1.

Now, let us discuss restrictions imposed on each parameter when the moire target value M is set to be not less than the permissible minimum Mmin of the moire fringe pitch. From Eq. (8), M is given as follows.

$$M=Hd\cdot Hi/(Hi-Hd)$$

Defining the difference DH between the pitch Hi of the intensity distribution or the horizontal pitch HL and the horizontal pixel pitch Hd as follows:

$$DH=Hi-Hd=HL-Hd,$$

M is given as follows.

$$M=HD\cdot(Hd+DH)/DH$$

Solving this with respect to DH, we obtain the following.

$$DH=Hd\cdot Hd/(M-Hd)$$

Since the moire fringe pitch M needs to be greater than Mmin, a requirement is as follows.

$$DH=Hd\cdot Hd/(M-Hd)<Hd\cdot Hd/(M\min-Hd)$$

This indicates that a condition for making the moire pitch M larger than Mmin is that the difference between Hi or HL and Hd is smaller than the following.

$$Hd\cdot Hd/(M\min-Hd)$$

From Eqs. (1) and (2), the following is derived.

$$Hi=HL=2\cdot E\cdot Lh1/(Lh0+Lh1)$$

Thus substituting this into Eq. (7), we obtain the following.

$$1/M=|1/Hd-(Lh0+Lh1)/(2\cdot E\cdot Lh1)|$$

Therefore, the condition for making the moire pitch M larger than Mmin is as follows.

$$1/M\min>|1/Hd-(Lh0+Lh1)/(2\cdot E\cdot Lh1)|$$

It is considered as to the permissible minimum Mmin of the moire fringe pitch M that the moire fringes are not so conspicuous if the pitch of the moire fringes is not smaller than the horizontal width W of the screen. Therefore, the permissible minimum Mmin is determined so as to satisfy the following condition.

$$M\min \geq W$$

It is also conceivable as an alternative condition that if the moire fringe pitch M is not less than two times the horizontal width of the screen as below the moire fringes will become more inconspicuous.

$$M\min \geq 2\cdot W$$

It is a matter of course that the influence of the moire fringes can also be decreased greatly if a smaller value than the minimum of the moire fringes described above is employed and that an arbitrary value can be selected freely in practical design within the scope in which the moire fringes become inconspicuous.

Specific numerical examples will be described below.
Let us suppose the following.

$$Hd=0.3 \text{ mm}$$

$$Vd=Vm=VL=0.3 \text{ mm}$$

$$t1a=t1b=1.0 \text{ mm}$$

$$t1a=t1e=0.5 \text{ mm}$$

$$n1a=n1b=n1d=n1e=n2=n3=1.5$$

$$E=65 \text{ mm}$$

$$Lh0=650 \text{ mm}$$

Let us suppose the horizontal width of the LCD is eight inches.

When the moire pitch M is set to the horizontal size of the LCD, 8 inches=203.2 mm, HL is derived as follows from Eq. (8).

HL=0.30044357 mm

From Eq. (9), we obtain the following.

Lh1=1.50569766 mm

Supposing d37=0, we obtain the following.

$t3=Lh1*n3$=2.258546499 mm $rh=Lh1\cdot(1.5-1.0)$=0.752848833 mm

Assuming d 23=0 mm and t2=3 mm, the following is derived from Eq. (18).

Lv2=3.50569766 mm

From Eqs. (15) and (17), we obtain the following.

d12=2.50569766 mm

From Eqs. (16) and (19), we obtain the following.

rv=0.87642442 mm

When the moire pitch M is set to two times the horizontal size of the LCD, 2×8 inches=16 inches=406.4 mm, HL is derived as follows from Eq. (8).

HL=0.3002216 mm

From Eq. (9), we obtain the following.

Lh1=1.50458278 mm

Supposing d37=0, we obtain the following.

$t3=Lh1*n3$=2.25687417 mm $rh=Lh1\cdot(1.5-1.0)$=0.75229139 mm

Assuming d23=0 mm and t2=3 mm, Lv2 is derived as follows from Eq. (18).

Lv2=3.50458278 mm

From Eqs. (15) and (17), we obtain the following.

d12=2.50458278 mm

From Eqs. (16) and (19), we obtain the following.

rv=0.876145695 mm

The present invention specifies each element as described above so as to prevent the moire fringes from being observed on the LCD surface by the observer, thereby accomplishing the stereoscopic image display apparatus permitting the good observation of stereoscopic image.

What is claimed is:

1. A stereoscopic image display apparatus comprising light source means for emitting patterned light in a predetermined shape, an optical system having a horizontal focal length and a vertical focal length different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a plurality of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein a difference DH between a horizontal pitch Hi of the patterned light and a horizontal pixel pitch Hd of the display device is not less than a predetermined value determined by a distance from the display device to the observer, the distance between the eyes of the observer, and a horizontal pitch of the pixel of the display device to prevent the moire fringes.

2. A stereoscopic image display apparatus comprising light source means for emitting patterned light in a predetermined shape, an optical system having a horizontal focal length and a vertical focal length different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a plurality of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein the optical system comprises a micro optical element in which a plurality of cylindrical lenses are arranged at a predetermined horizontal pitch HL and wherein a difference DH between the horizontal pitch HL and a horizontal pixel pitch Hd of the display device is not less than a predetermined value determined by a distance from the display device to the observer, the distance between the eyes of the observer, and a horizontal pitch of the pixel of the display device.

3. A stereoscopic image display apparatus comprising light source means for emitting patterned light in a predetermined shape, an optical system having a horizontal focal length and a vertical focal length different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a plurality of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein the optical system comprises a micro optical element in which a plurality of cylindrical lenses are arranged at a predetermined horizontal pitch HL and wherein a difference DH between the horizontal pitch HL and a horizontal pixel pitch Hd of the display device is not less than a predetermined value and wherein a difference DH between a horizontal pitch Hi of the patterned light and a horizontal pixel pitch Hd of the display device is not less than a predetermined value determined by a distance from the display device to the observer, the distance between the eyes of the observer, and a horizontal pitch of the pixel of the display device to prevent the moire fringes and, wherein said difference DH between the horizontal pitch Hi and the horizontal pixel pitch Hd satisfies the following relation:

$$(Hd \times Hd)/(M\max - Hd) < DH$$

where Mmax is a permissible maximum of moire fringes appearing as vertical stripes on said display device.

4. The stereoscopic image display apparatus according to claim 3, wherein said horizontal pitch Hi and horizontal pixel pitch Hd satisfy the following relation:

$$1/M\max < |(1/Hd) - (1/Hi)|$$

where Mmax is a permissible maximum of a horizontal pitch of moire fringes appearing as vertical stripes on said display device.

5. The stereoscopic image display apparatus according to claim 4, wherein said permissible maximum Mmax of the horizontal pitch of the moire fringes satisfies the following relation:

$$\arctan (M\max/L0) \leq 5'$$

where L0 is a distance from said display device to the observer.

6. The stereoscopic image display apparatus according to claim 4, wherein said permissible maximum Mmax of-the horizontal pitch of the moire fringes satisfies the following relation:

$$M\max \leq 2 \cdot Hd$$

Where Hd is the horizontal pixel pitch of the display device.

7. A stereoscopic image display apparatus comprising light source means for emitting patterned light in a predetermined shape, an optical system having a horizontal focal length and a vertical focal length different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a plurality of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein the optical system comprises a micro optical element in which a plurality of cylindrical lenses are arranged at a predetermined horizontal pitch HL and wherein a difference DH between the horizontal pitch HL and a horizontal pixel pitch Hd of the display device is not less than a predetermined value and wherein a difference DH between a horizontal pitch Hi of the patterned light and a horizontal pixel pitch Hd of the display device is not less than a predetermined value determined by a distance from the display device to the observer, the distance between the eyes of the observer, and a horizontal pitch of the pixel of the display device and, wherein said difference DH between the horizontal pitch HL and the horizontal pixel pitch Hd satisfies the following relation:

$$(Hd \times Hd)/(M\max - Hd) < DH$$

where Mmax is a permissible maximum of moire fringes appearing as vertical stripes on said display device.

8. The stereoscopic image display apparatus according to claim 7, wherein said horizontal pitch HL and horizontal pixel pitch Hd satisfy the following relation:

$$1/M\max < |(1/Hd) - (1/HL)|$$

where Mmax is a permissible maximum of a horizontal pitch of moire fringes appearing as vertical stripes on said display device.

9. The stereoscopic image display apparatus according to claim 8, wherein said permissible maximum Mmax of the horizontal pitch of the moire fringes satisfies the following relation:

$$\arctan (M\max/L0) \leq 5'$$

where L0 is a distance from said display device to the observer.

10. The stereoscopic image display apparatus according to claim 8, wherein said permissible maximum Mmax of the horizontal pitch of the moire fringes satisfies the following relation:

$$M\max \leq 2Hd$$

Where Hd is the horizontal pixel pitch of the display device.

11. A stereoscopic image display apparatus comprising light source means for emitting patterned light in a predetermined shape, an optical system having a horizontal focal length and a vertical focal length different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a plurality of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein a difference DH between a horizontal pitch Hi of the patterned light and a horizontal pixel pitch Hd of the display device is not less than a predetermined value determined by a distance from the display device to the observer, the distance between the eyes of the observer, and a horizontal pitch of the pixel of the display device to prevent the moire fringes and, wherein said horizontal pitch Hi and horizontal pixel pitch Hd satisfy the following relation:

$$1/M\max < |(1/Hd) - (1/Hi)|$$

where Mmax is a permissible maximum of a horizontal pitch of moire fringes appearing as vertical stripes on said display device.

12. A stereoscopic image display apparatus comprising light source means for emitting patterned light in a predetermined shape, an optical system having a horizontal focal length and a vertical focal length different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a plurality of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein the optical system comprises a micro optical element in which a plurality of cylindrical lenses are arranged at a predetermined horizontal pitch HL and wherein a difference DH between the horizontal pitch HL and a horizontal pixel pitch Hd of the display device is not less than a predetermined value determined by a distance from the display device to the observer, the distance between the eyes of the observer, and a horizontal pitch of the pixel of the display device and, wherein said horizontal pitch HL and horizontal pixel pitch Hd satisfy the following relation:

$$1/M\text{max} < |(1/Hd)|(1/HL)|$$

where Mmax is a permissible maximum of a horizontal pitch of moire fringes appearing as vertical stripes on said display device.

13. The stereoscopic image display apparatus according to any of claims 7, 11, and 12, wherein said permissible maximum Mmax of the horizontal pitch of the moire fringes satisfies the following relation:

$$\arctan (M\text{max}/L0) \leq 5'$$

where L0 is a distance from said display device to the observer.

14. A stereoscopic image display method for permitting the observer to observe a stereoscopic image from the stripe image displayed on the display device, using the stereoscopic image display apparatus as set forth in claim 13.

15. The stereoscopic image display apparatus according to any of claim 7, 11 and 12 wherein said permissible maximum Mmax of the horizontal pitch of the moire fringes satisfies the following relation:

$$M\text{max} \leq 2 \cdot Hd$$

where Hd is the horizontal pixel pitch of the display device.

16. A stereoscopic image display method for permitting the observer to observe a stereoscopic image from the stripe image displayed on the display device, using the stereoscopic image display apparatus as set forth in claim 15.

17. A stereoscopic image display apparatus comprising light source means for emitting patterned light in a predetermined shape, an optical system having a horizontal focal length and a vertical focal length different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a plurality of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein a difference DH between a horizontal pitch Hi of the patterned light and a horizontal pixel pitch Hd of the display device is not more than a predetermined value determined by the horizontal width of the display device, the distance between the eyes of the observer, and the horizontal pitch of the pixel of the display device to prevent the moire fringes.

18. A stereoscopic image display apparatus comprising light source means for emitting patterned light in a predetermined shape, an optical system having a horizontal focal length and a vertical focal length different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a plurality of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein the optical system comprises a micro optical element in which a plurality of cylindrical lenses are arranged at a predetermined horizontal pitch HL and wherein a difference DH between the horizontal pitch HL and a horizontal pixel pitch Hd of the display device is not more than a predetermined value determined by the horizontal width of the display device, the distance between the eyes of the observer, and the horizontal pitch of the pixel of the display device.

19. A stereoscopic image display apparatus comprising light source means for emitting patterned light in a predetermined shape, an optical system having a horizontal focal length and a vertical focal length different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a plurality of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein a difference DH between a horizontal pitch Hi of the patterned light and a horizontal pixel pitch Hd of the display device is not more than a predetermined value determined by the horizontal width of the display device, the distance between the eyes of the observer, and the horizontal pitch of the pixel of the display device to prevent the moire fringes, and wherein said difference DH between the horizontal pitch Hi and the horizontal pixel pitch Hd satisfies the following relation:

$$DH < (Hd \times Hd)/(M\text{min} - Hd)$$

where Mmin is a permissible minimum of moire fringes appearing as vertical stripes on said display device.

20. The stereoscopic image display apparatus according to claim 19, wherein said horizontal pitch Hi and horizontal pixel pitch Hd satisfy the following relation:

$$|(1/Hd) - (1/Hi)| < 1/M\text{min}$$

where Mmin is a permissible minimum of a horizontal pitch of moire fringes appearing as vertical stripes on said display device.

21. The stereoscopic image display apparatus according to claim 20, wherein said permissible minimum Mmin of the horizontal pitch of the moire fringes satisfies the following relation:

$$M\min \geq W$$

where W is a horizontal width of the display device.

22. The stereoscopic image display apparatus according to claim 20, wherein said permissible minimum Mmin of the horizontal pitch of the moire fringes satisfies the following relation:

$$M\min \geq 2 \cdot W$$

where W is a horizontal width of the display device.

23. A stereoscopic image display apparatus comprising light source means for emitting patterned light in a predetermined shape, an optical system having a horizontal focal length and a vertical focal length different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a plurality of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein the optical system comprises a micro optical element in which a plurality of cylindrical lenses are arranged at a predetermined horizontal pitch HL and wherein a difference DH between the horizontal pitch HL and a horizontal pixel pitch Hd of the display device is not more than a predetermined value determined by the horizontal width of the display device, the distance between the eyes of the observer, and the horizontal pitch of the pixel of the display device and, wherein said difference DH between the horizontal pitch HL and the horizontal pixel pitch Hd satisfies the following relation:

$$DH < (Hd \times Hd)/(M\min \times Hd)$$

where Mmin is a permissible minimum of moire fringes appearing as vertical stripes on said display device.

24. The stereoscopic image display apparatus according to claim 23, wherein said horizontal pitch HL and horizontal pixel pitch Hd satisfy the following relation:

$$|(1/Hd)-(1/HL)| < 1/M\min$$

where Mmin is a permissible minimum of a horizontal pitch of moire fringes appearing as vertical stripes on said display device.

25. The stereoscopic image display apparatus according to claim 24, wherein said permissible minimum Mmin of the horizontal pitch of the moire fringes satisfies the following relation:

$$M\min \geq W$$

where W is a horizontal width of the display device.

26. The stereoscopic image display apparatus according to claim 24, wherein said permissible minimum Mmin of the horizontal pitch of the moire fringes satisfies the following relation:

$$M\min \geq 2 \cdot W$$

where W is a horizontal width of the display device.

27. A stereoscopic image display apparatus comprising light source means for emitting patterned light in a predetermined shape, an optical system having a horizontal focal length and a vertical focal length different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a plurality of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein a difference DH between a horizontal pitch Hi of the patterned light and a horizontal pixel pitch Hd of the display device is not more than a predetermined value determined by the horizontal width of the display device, the distance between the eyes of the observer, and the horizontal pitch of the pixel of the display device to prevent the moire fringes, and wherein said horizontal pitch Hi and horizontal pixel pitch Hd satisfy the following relation:

$$|(1/Hd)-(1/Hi)| < 1/M\min$$

where Mmin is a permissible minimum of a horizontal pitch of moire fringes appearing as vertical stripes on said display device.

28. A stereoscopic image display apparatus comprising light source means for emitting patterned light in a predetermined shape, an optical system having a horizontal focal length and a vertical focal length different from each other, and a transmission type display device, said stereoscopic image display apparatus being arranged in such a manner that the display device displays a stripe image which is an image obtained by alternating right stripe pixels and left stripe pixels in a predetermined order, said right stripe pixels and left stripe pixels being obtained by dividing each of a parallax image for the right eye and a parallax image for the left eye into a lot of stripe-shape pixels, the patterned light emitted from the light source means is provided with directivity by the optical system to irradiate the stripe image, and the beam is separated into at least two areas, so as to permit an observer to visually recognize the stripe image as a stereoscopic image, wherein the optical system comprises a micro optical element in which a plurality of cylindrical lenses are arranged at a predetermined horizontal pitch HL and wherein a difference DH between the horizontal pitch HL and a horizontal pixel pitch Hd of the display device is not more than a predetermined value determined by the horizontal width of the display device, the distance between the eyes of the observer, and the horizontal pitch of the pixel of the display device, and wherein said horizontal pitch HL and horizontal pixel pitch Hd satisfy the following relation:

$$|(1/Hd)-(1/HL)| < 1/M\min$$

where Mmin is a permissible minimum of a horizontal pitch of moire fringes appearing as vertical stripes on said display device.

29. The stereoscopic image display apparatus according to any of claims 19 to 28, wherein said permissible minimum Mmin of the horizontal pitch of the moire fringes satisfies the following relation:

$$M\text{min} \geq W$$

where W is a horizontal width of the display device.

30. A stereoscopic image display method for permitting the observer to observe a stereoscopic image from the stripe image displayed on the display device, using the stereoscopic image display apparatus as set forth in claim 29.

31. The stereoscopic image display apparatus according to any of claims 19 to 28, wherein said permissible minimum Mmin of the horizontal pitch of the moire fringes satisfies the following relation:

$$M\text{min} \geq 2 \cdot W$$

where W is a horizontal width of the display device.

32. A stereoscopic image display method for permitting the observer to observe a stereoscopic image from the stripe image displayed on the display device, using the stereoscopic image display apparatus as set forth in Claim 31.

33. A stereoscopic image display method for permitting the observer to observe a stereoscopic image from the stripe image displayed on the display device, using the stereoscopic image display apparatus as set forth in any of claims 3 to 12 and 19 to 28.

* * * * *

UNITED STATES PATENT AND TRADEMARK OFFICE
CERTIFICATE OF CORRECTION

PATENT NO. : 6,204,967 B1
DATED : March 20, 2001
INVENTOR(S) : Hideki Morishima et al.

It is certified that error appears in the above-identified patent and that said Letters Patent is hereby corrected as shown below:

Column 1,
Line 48, "a" should read -- an --.

Column 3,
Line 59, "(Hd × Hd)/Mmax × Hd) < DH" should read -- (Hd × Hd)/(Mmax-Hd)<DH --.

Column 5,
Line 24, "(Mmin - Hd = 1)" should read -- (Mmin - Hd) --.

Column 8,
Line 48, "Likewise," should read -- ¶Likewise, --.

Column 12,
Line 18, "the" should be deleted.

Column 14,
Line 1, "DH=Hi-Hd=HL-Hd," should read -- DH=Hi-Hd≈HL-Hd, --.

Column 17,
Line 25, "of-the" should read -- of the --.
Line 31, "Where" should read -- where --.

Column 18,
Line 24, "Mmax ≦ ·2Hd" should read -- Mmax ≦ 2·Hd --.
Line 26, "Where" should read -- where --.

Column 19,
Line 19, "1/Mmax < |(1/Hd)|(1/HL)|" should read -- 1/Mmax < |(1/Hd)-(1/HL)| --.
Line 38, "claim" should read -- claims --; and "12" should read -- 12, --.

Column 21,
Line 43, "DH<(Hd × Hd)/(Mmin × Hd)" should read -- DH<(Hd × Hd)/(Mmin - Hd) --.

Column 22,
Line 67, "19 to 28," should read -- 19, 23, 27 and 28, --.

UNITED STATES PATENT AND TRADEMARK OFFICE
CERTIFICATE OF CORRECTION

PATENT NO. : 6,204,967 B1
DATED : March 20, 2001
INVENTOR(S) : Hideki Morishima et al.

It is certified that error appears in the above-identified patent and that said Letters Patent is hereby corrected as shown below:

<u>Column 23,</u>
Line 11, "19 to 28," should read -- 19, 23, 27 and 28, --.

<u>Column 24,</u>
Line 11, "3 to 12 and 19" should read -- 3, 7, 11, 12, 19, 23, 27 and --.

Signed and Sealed this

Twenty-third Day of April, 2002

Attest:

Attesting Officer

JAMES E. ROGAN
*Director of the United States Patent and Trademark Office*